Sept. 15, 1936. R. R. CANDOR Re. 20,107

REFRIGERATING APPARATUS

Original Filed Feb. 28, 1929 2 Sheets-Sheet 1

Inventor

Robert R. Candor

By Spencer, Hardman & Fehr

Attorneys

Sept. 15, 1936. R. R. CANDOR Re. 20,107

REFRIGERATING APPARATUS

Original Filed Feb. 28, 1929 2 Sheets-Sheet 2

Inventor
Robert R. Candor
By Spencer, Hardman & Fehr
Attorneys

Reissued Sept. 15, 1936 Re. 20,107

UNITED STATES PATENT OFFICE 20,107

REFRIGERATING APPARATUS

Robert R. Candor, Dayton, Ohio, assignor, by mesne assignments, to General Motors Corporation, a corporation of Delaware Original No. 1,904,991, dated April 25, 1933, Serial No. 343,399, February 28, 1929. Application for reissue November 16, 1933, Serial No. 698,378

17 Claims. (Cl. 62—115)

This invention relates to refrigerating apparatus and more particularly to an apparatus combining the advantages of the compressor and of the absorbent type of refrigerating systems.

An object of this invention is to provide a refrigerating system in which the refrigerant liquefying action is produced by both an absorber and a compressor.

Another object of this invention is to provide means for lengthening the operating cycles of an automatically controlled refrigerant liquefying means.

Another object is to provide an apparatus capable of using absorbents and refrigerants which might not be discharged or released by the absorbents at the proper working pressures for economical condensation or evaporation.

Another object of this invention is to provide a means for lengthening the cycles in mechanical refrigerating water cooling apparatus.

Another object of this invention is to provide a water cooling apparatus in which refrigeration occurs substantially only when there is a demand for cooled drinking water or other liquids.

Further objects and advantages of the present invention will be apparent from the following description, reference being had to the accompanying drawings, wherein a preferred form of the present invention is clearly shown.

Figure 1:
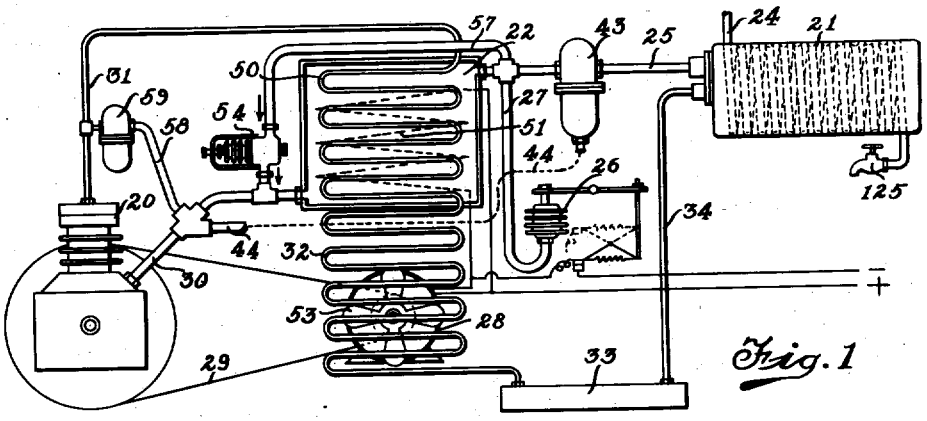
Fig. 1 is a diagrammatic view of a refrigerating apparatus embodying the features of this invention.
Figure 2:
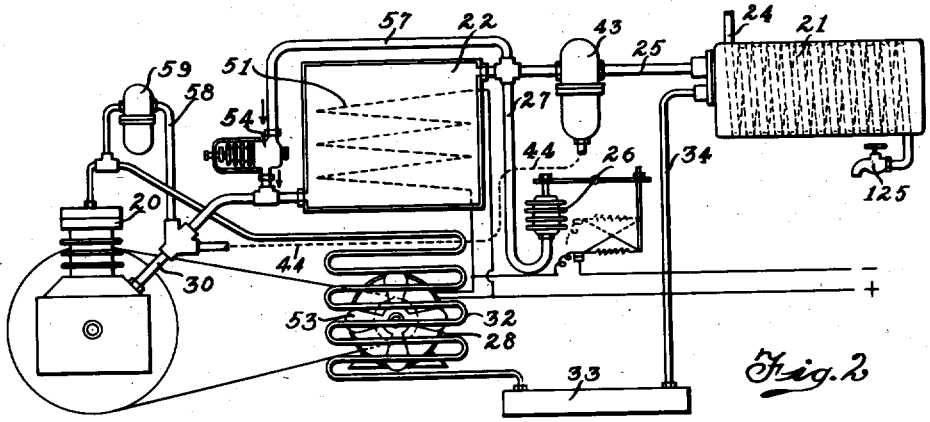
Fig. 2 is a view similar to Fig. 1 of a slightly modified form embodying features of the invention.
Figure 3:
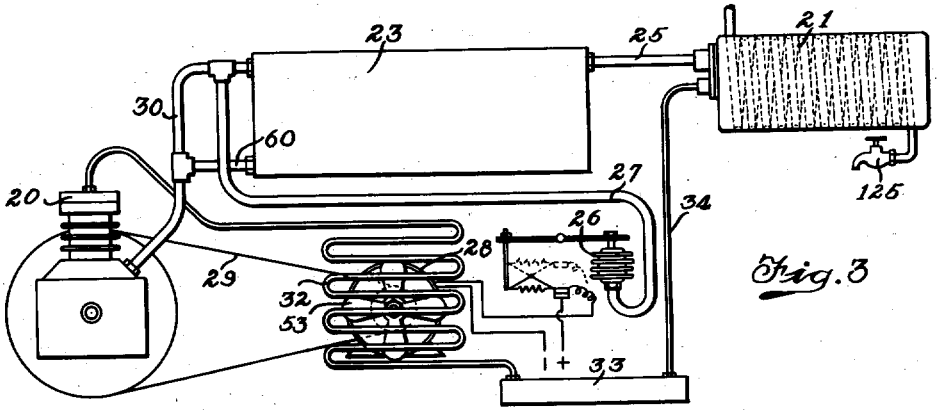
Fig. 3 is a view similar to Fig. 1 of a further modified form embodying features of the invention.
Figure 4:
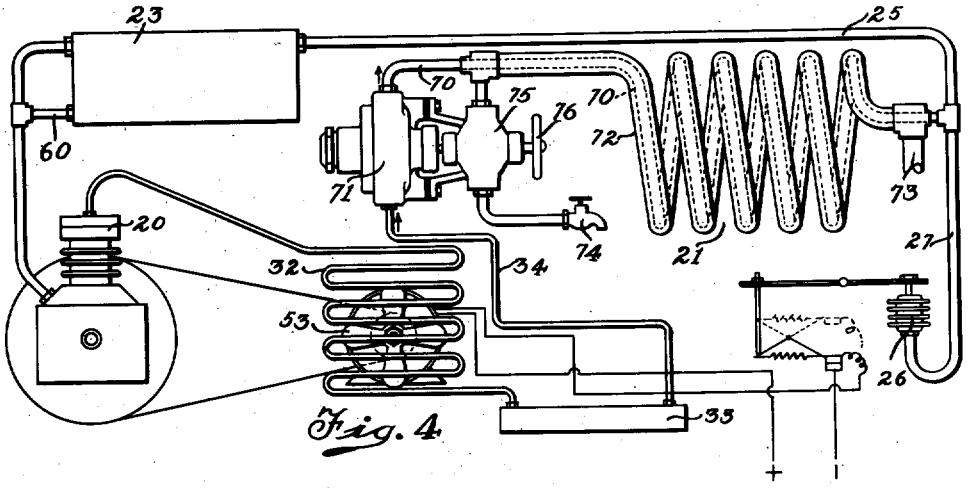
Fig. 4 is a view similar to Fig. 1 of a further modification embodying certain features of the invention.

Refrigerating apparatus embodying features of this invention may include in general a liquid refrigerant supply and gaseous refrigerant liquefying means. Also an evaporator may be so connected with such means in such a manner that the liquid refrigerant is supplied to the evaporator and the gaseous refrigerant formed in the evaporator is returned to said means to be reliquefied. This means may further include a large capacity gas receiver adapted to receive gaseous refrigerant from the evaporator and to store the same for a relatively long period of time so that, if the operation is cyclic, this large capacity gas receiver tends to lengthen the time of each cycle. More specifically, a refrigerating system may include an automatically starting and stopping compressor 20, an evaporator 21 and a large capacity gas receiver, which in Figs. 1 and 2 is designated as 22 and in Figs. 3 and 4 is designated as 23. The large capacity gas receiver 22 may, if desired, contain an absorbing material which is adapted to absorb the gaseous refrigerant in a manner which increases the capacity of the gas receiver beyond the ordinary volumetric capacity for the gas. In Figs. 3 and 4 the gas receiver 23 need not, but may, contain an absorbing material. When it does not contain such material the casing forming the receiver is made of such a large capacity that the normal operating cycle of the compressor 20 is very materially lengthened.

Under certain conditions, it may occur that certain absorbents in combination with certain refrigerants do not release the refrigerant at the proper pressure to provide economical condensation, such as by air cooling or the like. Again it may occur that, in order to obtain necessary refrigerant pressures for obtaining proper condensation, it might be necessary to heat the absorber beyond the temperature for most economical total or partial release of the refrigerant from the absorbent. Under such conditions, or similar conditions, the use of the apparatus herein disclosed obviates many of these difficulties since the compressor takes the refrigerant, released from the absorbent under economical temperatures and increases the pressures to such a degree that economical condensation may be accomplished with the particular condenser cooling medium available.

Again, there are refrigerating systems of the type which are automatically started and stopped in accordance with temperature conditions in some part of the system, such as the evaporator, and are subject to certain demands where the starting and stopping occurs too frequently for satisfactory operation. This too frequent starting and stopping is liable to wear out the motor, if a motor is used, and the switch contacts, if a switch is used or may wear out any other type of control. Conditions which tend to so operate a refrigerating system sometimes occur, for instance, in water cooling devices. For instance, in Fig. 1 a water cooling conduit 24 may be in thermal relation with the refrigerant in the evaporator 21 and may drain off through draft means 125 after the water has been suitably cooled. Where the amount of water which is cooled during a period of non-demand is relatively small, the refrigerating system is liable to cycle practically with each demand upon the water cooler. Water coolers of this type have been termed "instantaneous water coolers". The chief objection to these water coolers has been that their automatic refrigerating systems cycle entirely too frequently.

Figure 5:
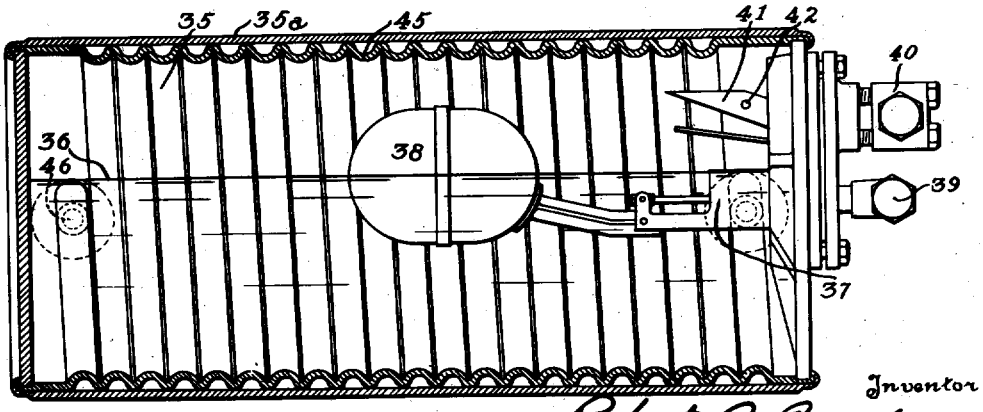
Fig. 5 is a cross sectional view of a water cooling evaporator which may be used.

In accordance with this invention, the operating cycles of the refrigerating system may be materially lengthened. Thus in Fig. 1 the gaseous refrigerant passes from the evaporator 21 through the pipe 25 to the absorber or gas receiver 22. On account of the large capacity of the receiver 22, the compressor 20 does not ordinarily start immediately after a small amount of gas is discharged by the evaporator 21. On the contrary, the gaseous refrigerant remains in the receiver 22 until its large capacity has been taxed to its limit. When this limit has been reached the consequent rise in temperature in the refrigerant of evaporator 21 causes the compressor to start operating. Preferably this is accomplished by providing an expansible bellows 26 connected by the pipe 27 which controls the starting and stopping of the motor 28 which drives the compressor 20, for instance, through a belt 29. The gaseous refrigerant in the receiver 22 is then transferred through the pipe 30 to the intake of the compressor 20. The compressed refrigerant is discharged from the compressor through the pipe 31 after which it is reliquefied preferably in the condenser 32 and may be stored in a liquid refrigerant receiver 33. The liquid refrigerant is discharged through the pipe 34 into the evaporator 21. In the embodiment shown in Figs. 1, 2 and 3, the evaporator may embody some or all of the features disclosed in Fig. 5. Thus the evaporator may comprise a boiler 35 in which automatic means for maintaining a body of refrigerant may be provided. Preferably this includes a valve 37 adapted to be controlled by the float 38 in the well known manner. The liquid refrigerant from the pipe 34 enters through a fitting 39 through the valve 37 into the boiler 35. The gaseous receiving fitting 40 may be fed through a funnel 41 and may be discharged through the pipe 25. A lubricant or oil return 42 may also be provided for returning the oil or lubricant to the compressor. When the lubricant is thus carried into the evaporator by the liquid refrigerant, a lubricant separator 43 may be provided for separating the lubricant from the gaseous refrigerant which lubricant may be bypassed by pipe 44 around the gas receiver to the pipe 30. The water conduit 24, if it is used, may be in thermal contact with the body of liquid refrigerant, and preferably this is accomplished by providing a suitable spiral groove 45 in the boiler 35 so that the water circulates between the boiler 35 and the outer shell 35a in thermal contact with the refrigerant 36 and is cooled thereby. When a demand for cooled water is made on the relatively small water storage means, the cooled water entering through the water inlet 46 from the pipe 24 causes boiling of the refrigerant, which in prior devices, would have caused almost immediate starting of the motor 28 due to the rapid rise of the temperature and pressure of the refrigerant 36. This rapid rise in temperature is caused, possibly, because of the relatively large amount of uncooled water which comes in direct thermal contact with the liquid refrigerant before the water can be precooled by mixture with previously cooled water. In accordance with this invention, such frequent cycling is obviated.

When the gas receiver 22 contains absorbing material, it is preferred to provide means for causing the absorbing material to release the absorbed refrigerant while the compressor is operating. This may be accomplished by any suitable means. Thus, if desired, a portion of the condenser 32 may be embedded or brought thermally in contact with the absorbent in the receiver 22. When the compressor 20 begins to operate, the compressed refrigerant passing through the pipe 31 is in a heated condition, and if this is passed through the section 50 of the condenser 32 which is embedded in the absorbent, this heat tends to liberate the absorbed refrigerant. If desired, however, additional means for releasing the refrigerant may be provided. Thus a heater, such as an electric heater 51, may also heat the absorbent, and if the heater is electric, it may be embedded in the absorbent, and such electric heater may be placed in parallel relation with the motor 28 so that electric current flows to the absorbent during the operation of the motor 28, and consequently of the compressor 20. If desired, the heater alone may be used for releasing the absorbed refrigerant as shown in Fig. 2, in which case the condenser 32 is cooled solely by other cooling means such as a fan 53. The compressor thus increases the pressure of the released refrigerant, with advantages heretofore pointed out.

Figure 6:
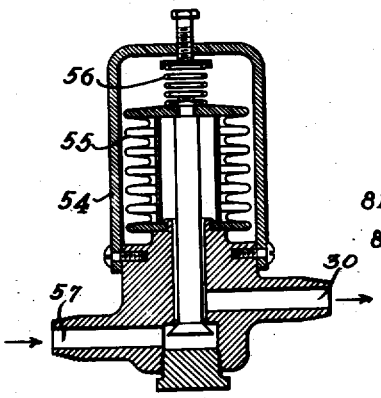
Fig. 6 is a cross sectional view of an element which may be used in certain forms of the refrigerating system.

In order to supply, immediately, gaseous refrigerant to the compressor 20 before the absorbent material releases refrigerant, an automatic valve 54, for instance, as shown in Fig. 6, is adapted to open its valve member in accordance with the refrigerant pressure in the pipe 30. Thus when the pressure in the pipe 30 is reduced by the operation of the compressor 20, the bellows 55 tends to collapse with the pressure of the adjustable spring 56, so that refrigerant is supplied by means of the bypass 57 direct to the compressor 20 from the evaporator 21 until the absorbent material begins to release refrigerant in sufficient quantity. In order to prevent an undue accumulation of gaseous refrigerant on one side of the system, a bypass 58 may be provided which also includes a safety valve 59 of the pressure regulating type so that undue pressures in the pipe 31 may be bypassed to the pipe 30.

In the modification shown in Fig. 3 the gas receiver 23 may be a large tank adapted to receive the gaseous refrigerant from the evaporator 21 without quickly building up the pressure of the refrigerant so that the length of the cycle of the compressor is very materially increased. Otherwise this refrigerating system may be substantially like that of Fig. 2 with the further exception that the lubricant separator 43, the bypass 57 and the heater 51 need not be provided. A lubricant passage 60 may be provided at the bottom of the tank 23 in order to pass the lubricant to the compressor 20 as it may be separated in the gas receiver.

Figure 7:
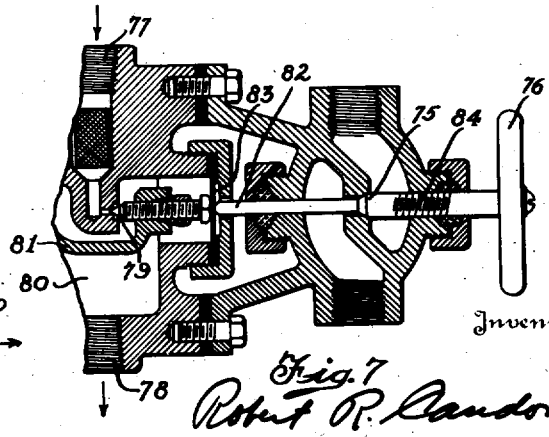
Fig. 7 is a cross sectional view of another element which may be used in certain forms of the system.

In the modification shown in Fig. 4 the evaporator 21 corresponding to the one shown in Figs. 1, 2 and 3 is modified to the expansion type of evaporator. Thus there is provided an expansion coil 70 which is provided with an automatic pressure regulating valve 71. The expanded refrigerant, after it has passed through the coil 70, is discharged into the pipe 25 returning to the compressor as in the other modifications. A water cooling conduit 72 may be placed in thermal contact with the refrigerant coil 70, for instance, by making them concentric. The water cooling conduit is supplied with water from any suitable source through the inlet 73 and is discharged through the draft means 74. Preferably the draft means 74, if it should be a faucet, remains open continuously. A valve 75 may be provided for controlling the flow of water from the water cooling device. The valve 75 may be provided with manual controlling means 76 which manual controlling means may be in common with the means for shutting off the automatic valve 71. Thus the automatic valve 71 may be prevented from supplying liquid refrigerant to the coil 70 except when there is a demand for cooled water, as when the manual means 76 is operated. As shown in Fig. 7, the liquid refrigerant from the pipe 34 enters through the inlet 77 and passes through the outlet 78 to the coil 70. The valve may be provided with a throttling device 79 which is operated by a diaphragm, not shown, which is responsive to the pressure of the refrigerant in chamber 80 and in the coil 70, and which operates the throttling device 79 by means of the yoke 81. This valve may be substantially as shown in the Turkish patent to Delco-Light Co., No. 607, patented Feb. 13, 1928, or in the U. S. application of Harry B. Hull S. N. 222,900, filed September 29, 1927, now matured into Patent No. 1,836,072. The throttling device 79 is adapted to be locked so that there is no passage of refrigerant when there is no demand for cooled water. For instance, this may be accomplished by having the stem 82 placed against the head of the throttling device 79 through the medium of the diaphragm 83 which prevents leakage of refrigerant into the atmosphere. The valve 75 and the throttling device 79 are thus simultaneously released by the turn of the manual means 76 which, for instance, may move the stem 82 axially because of the threaded engagement at 84. Thus it is seen that there is no refrigeration wasted or substantial heat leakage during the periods of non-demand. Further, the flow of the liquid refrigerant in the coil 70 and the flow of water in the conduit 72 are in relatively opposed directions so that the coldest part of the coil 70 is in thermal relation with the water nearest the draft means. Thus the water is cooled to the minimum temperature possible depending on the capacity of the evaporator.

The various evaporators may be insulated against heat infiltration in any suitable manner. Also the evaporators may be used for purposes other than for cooling water, and may, according to some features, be used for cooling household refrigerators, ice cream cabinets and the like.

While the form of embodiment of the invention as herein disclosed, constitutes a preferred form, it is to be understood that other forms might be adopted, all coming within the scope of the claims which follow.

What is claimed is as follows:

1. A refrigerating apparatus including liquid refrigerant supplying and gaseous refrigerant liquefying means, an expansion coil receiving liquid refrigerant from said means, an automatic pressure regulating valve for said coil, a water cooling conduit in thermal relation with said coil, the flow of regriferant in said coil and of liquid in said conduit being in relatively opposite directions, a valve for said conduit, said last named valve and said regulating valve having common manual means for controlling same.

2. A refrigerating apparatus comprising an absorber, compressor and evaporator connected in closed circuit relationship and a lubricant separator adapted to bypass lubricant around said absorber.

3. A refrigerating apparatus comprising an absorber, a compressor, condenser and evaporator connected in closed circuit relationship and a lubricant separator adapted to bypass lubricant around said absorber.

4. A refrigerating system comprising in combination, an absorber, a compressor, and an evaporator connected in closed circuit relationship, a condenser having a portion thereof in thermal contact with the interior of said absorber for heating the same, means for driving said compressor, means responsive to conditions in a part of said circuit for starting and stopping said compressor driving means, means in addition to said condenser for augmenting heating of said absorber during operation of said compressor, said heating means being rendered effective by said second named means.

5. A refrigerating system comprising in combination, an absorber, a compressor, and an evaporator connected in closed circuit relationship, a condenser including inlet and outlet portions and having the inlet portion thereof disposed within said absorber for heating same, an electric motor for driving said compressor, a switch actuated in response to conditions in a part of said circuit to cause starting and stopping of said motor, an electric heater for augmenting heating of said absorber during operation of said compressor, said electric heater being rendered effective by said switch.

6. A refrigerating system comprising in combination, an absorber, a compressor, an evaporator, and a condenser all connected together in closed circuit relationship; means for driving said compressor, means responsive to conditions in a part of said circuit for controlling operations of said compressor driving means, and means independent of the closed refrigerant circuit, disposed in said absorber for heating the absorber, said last named means being rendered effective by said second named means only during operation of said compressor.

7. A refrigerating system comprising in combination, an absorber, a compressor, an evaporator, and a condenser all connected together in closed circuit relationship; means for driving said compressor, means responsive to conditions in a part of said circuit for controlling operations of said compressor driving means, and an electric heater for heating said absorber, said heater being rendered effective by said second named means only during operation of said compressor.

8. A refrigerating apparatus including a liquid refrigerant supplying and gaseous refrigerant liquefying means, an expansion coil receiving liquid refrigerant from said means, an automatic pressure regulating valve for said coil, a water cooling conduit in thermal relation with said coil, a valve for said conduit, said last named valve and said regulating valve having common manual means for controlling same.

9. A refrigerating apparatus comprising a flooded evaporator, a float control for maintaining a body of liquid refrigerant in said evaporator, means forming a winding passageway for liquid to be cooled in thermal contact with said body of liquid refrigerant, a compressor, a suction pipe connecting said evaporator and compressor, an enlarged gas reservoir for storing gaseous refrigerant only and connected to said suction pipe, a condenser receiving the refrigerant discharge from said compressor, a liquid refrigerant flow connection between said condenser and evaporator, an electric motor drivingly connected to said compressor, a switch controlling the operation of said motor, and means responsive to refrigerant pressure in said evaporator for controlling said switch.

10. A refrigerating apparatus comprising an evaporator, a compressor, a suction pipe connecting said evaporator and compressor, an enlarged gas reservoir for storing gaseous refrigerant only and connected to said suction pipe, a condenser receiving the refrigerant discharge from said compressor, a liquid refrigerant flow connection between said condenser and evaporator, an electric motor drivingly connected to said compressor, a switch controlling the operation of said motor, and means responsive to refrigerant pressure in said evaporator for controlling said switch.

11. A refrigerating apparatus comprising an evaporator containing a body of liquid refrigerant, a large capacity gas reservoir for storing gaseous refrigerant only and a compressor and a condenser connected to said evaporator in closed circuit relationship, said receiver being connected to the suction side of said compressor, an electric motor drivingly connected to said compressor, a switch controlling the operation of said motor, and means operating said switch in response to conditions in said apparatus.

12. A refrigerating apparatus comprising an evaporator, a compressor, a suction pipe connecting said evaporator and compressor, an enlarged gas reservoir for storing gaseous refrigerant only and connected to said suction pipe, a condenser receiving the refrigerant discharge from said compressor, a fan for cooling said condenser, a liquid refrigerant flow connection between said condenser and evaporator, an electric motor drivingly connected to said compressor, a switch controlling the operation of said motor, and means operating said switch in response to conditions in said apparatus.

13. A refrigerating apparatus comprising a flooded evaporator, a float control for maintaining a body of liquid refrigerant in said evaporator, a compressor, a suction pipe connecting said evaporator and compressor, an enlarged gas reservoir for storing gaseous refrigerant only and connected to said suction pipe, a condenser receiving the refrigerant discharge from said compressor, a liquid refrigerant flow connection between said condenser and evaporator, an electric motor drivingly connected to said compressor, a switch controlling the operation of said motor, and means operating said switch in response to conditions in said apparatus.

14. A refrigerating apparatus comprising a flooded evaporator, a float control for maintaining a body of liquid refrigerant in said evaporator, means forming a winding passageway for liquid to be cooled in thermal contact with said body of liquid refrigerant, a compressor, a suction pipe connecting said evaporator and a compressor, an enlarged gas reservoir for storing gaseous refrigerant only and connected to said suction pipe, a condenser receiving the refrigerant discharge from said compressor, a liquid refrigerant flow connection between said condenser and evaporator, an electric motor drivingly connected to said compressor, a switch controlling the operation of said motor, and means responsive to temperature conditions in said apparatus for controlling said switch.

15. A refrigerating apparatus comprising an evaporator containing a body of liquid refrigerant, a large capacity gas reservoir for storing gaseous refrigerant only and a compressor and a condenser connected to said evaporator in closed circuit relationship, said receiver being connected to the suction side of said compressor, an electric motor drivingly connected to said compressor, a switch controlling the operation of said motor, and means operating said switch in response to conditions in said apparatus.

16. A refrigerating apparatus comprising a conduit for liquid to be cooled, an evaporator containing a body of liquid refrigerant in thermal contact with said conduit, means automatically controlling the flow of liquid refrigerant in said evaporator, a compressor, a suction pipe connecting said evaporator and compressor, an enlarged gas reservoir for storing gaseous refrigerant only and connected to said suction pipe, a condenser receiving the refrigerant discharge from said compressor, a liquid refrigerant flow connection between said condenser and evaporator, and automatic mans for controlling the operation of said compressor in accordance with conditions in said apparatus.

17. A refrigerating apparatus comprising an evaporator, a compressor, a suction pipe connecting said evaporator and compressor, an enlarged gas reservoir for storing gaseous refrigerant only and connected to said suction pipe, a condenser receiving the refrigerant discharge from said compressor, a liquid refrigerant flow connection between said condenser and evaporator, an electric motor drivingly connected to said compressor, a switch controlling the operation of said motor, and means operating said switch in response to conditions in said apparatus.

ROBERT R. CANDOR.